Aug. 22, 1950  S. M. DUKE  2,519,827
COMBINED INSULATOR AND METALLIC CLAMPING SUPPORT
Filed July 29, 1946

INVENTOR
STEPHEN M. DUKE

BY Robert A. Lavender
ATTORNEY

Patented Aug. 22, 1950

2,519,827

UNITED STATES PATENT OFFICE 2,519,827

COMBINED INSULATOR AND METALLIC CLAMPING SUPPORT

Stephen M. Duke, Birmingham, England

Application July 29, 1946, Serial No. 687,017

8 Claims. (Cl. 174—163)

The present invention relates to insulating structure and more particularly to a combination of an insulating ceramic body and a metallic body assembled thereto.

Since unequal thermal expansion and contraction of ceramic and metallic bodies combined in an assembly would normally result in loosening of the assembly, or damage to the fragile ceramic body due to excessive pressure thereon by the metallic body, the parts are designed so that a firm assembly persists despite unequal expansion and contraction. Broadly stated, this condition follows from providing all contacting surfaces between the ceramic and metallic body in radially disposed relation with respect to some single point within the assembly. In order to permit assembly, the metallic body is formed of separable elements.

It is accordingly an object of the present invention to provide an insulating structure, including metallic and ceramic bodies so designed that unequal thermal expansion will result in neither loosening of the assembly nor damage to the ceramic body by excessive pressure thereon.

Figure 1:
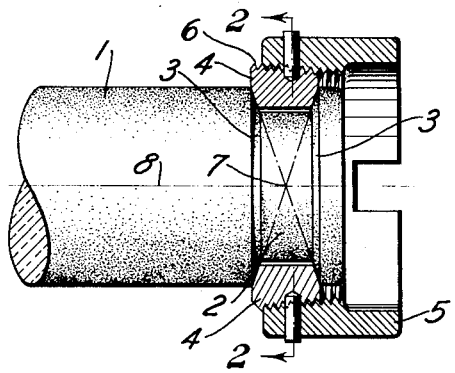
Figure 1 is a fragmentary section through an insulator assembly, embodying the present invention.
Figure 2:
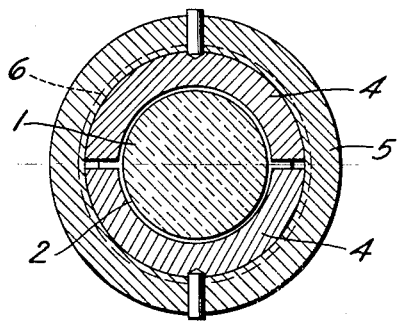
Fig. 2 is a section on the line 2—2, Fig. 1.

Referring to Figs. 1 and 2 of the drawing, the insulator 1 is provided with a peripheral groove 2 having conical side walls 3, 3. The cap (normally having a closed top, rather than open as shown in Fig. 1) comprises a split ring 4, of two or more segments, seated in the groove 2, as shown, and a cap 5 screwed around the split ring to hold it together. By employing tapered threads 6, the split ring may be forced radially into the groove 2 to provide any desired gripping pressure. The conical side walls 3, 3 when extended must intersect at a single point 7, which, in this embodiment, must be on the axis 8 of the insulator and must be smooth enough to permit radial outward movement of the split ring when the temperature of the assembly is raised, in order that the radial pressure of the ring in the groove will not change when the assembly is heated in use. This result is independent of difference between the coefficients of thermal expansion of the insulator and the cap assembly.

Figure 3:
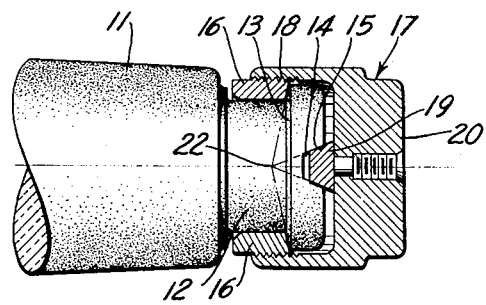
Fig. 3 is an axial section through a second embodiment of the present invention.
Figure 4:
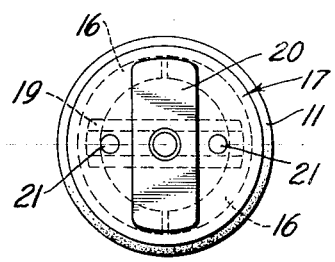
Fig. 4 is an end elevation of the modification shown in Fig. 3.

Referring to Figs. 3 and 4 of the drawing, the insulator 11 is provided with a peripheral groove 12 having a conical side wall 13 and a key slot 14 with tapered sides 15 in the end of the insulator. The cap comprises a split ring 16, of two or more segments, seated in the groove 12, as shown; a cup 17 screwed around the split ring by threads 18 (not tapered) to hold it in place in the groove 12; and a key 19, seated in the key slot 14, as shown, and held therein by the pressure of the top 20 of cup 17. By threaded engagement of the cup and the split ring, the latter is urged tightly against the conical side wall 13 of the groove 12 and the key 19 is urged tightly into the key slot 14. Pins 21, 21 doweled through the cup 17 and into the key 19 after assembly of the other parts, prevent subsequent rotation of the cup with respect to the rest of the assembly. The conical side wall 13 and the tapered side walls 15, when extended, have a common point of intersection 22, and these surfaces must be smooth enough to permit outward movement of the split ring 16 and the key 19 when the assembly is heated in use. With such an arrangement, the pressure on these surfaces will not change regardless of difference between the coefficients of thermal expansion of the insulator and the cap assembly.

Figure 5:
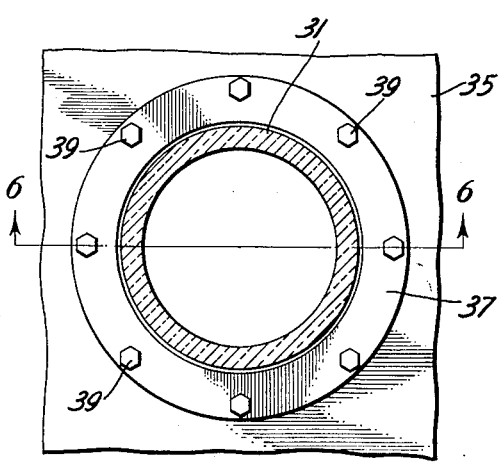
Fig. 5 is an end elevation of a third modification of the present invention.
Figure 6:
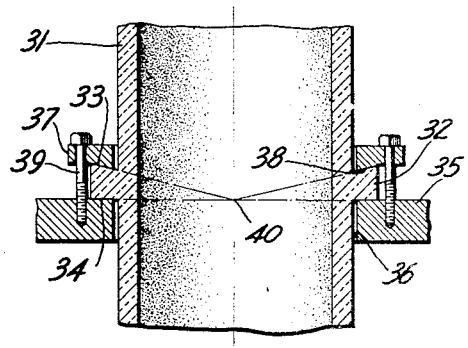
Fig. 6 is a section on the line 6—6, Fig. 5.

Referring to Figs. 5 and 6, the cylindrical insulator tube 31 is provided with an outstanding peripheral rib 32 having an upper conical surface 33 and a lower plane surface 34. The plate 35 through which the insulator tube is passed and to which it is rigidly mounted, is provided with an aperture 36 surrounding the insulator tube adjacent the peripheral rib 32, as shown. A ring 37, having a lower conical surface 38, also surrounds the insulator tube 31, with its surface 38 bearing on the surface 33 of the peripheral rib 32. Bolts 39, uniformly spaced around the ring 37 adjacent its outer perimeter, pass through the ring and into threaded engagement with the plate 35. When tightened, bolts 39 urge the ring 37 firmly against the surface 33 of the peripheral rib 32, clamping it rigidly between the ring and plate 35. The conical surface 33 and the plane bearing surface 34, when extended, intersect at a single point 40, and these surfaces must be smooth enough to permit radial outward movement of the ring 37 and the contacting surface of the plate 35 as the assembly is heated in use. With such an arrangement, the pressure on the surfaces 33 and 34 will not change regardless of difference between the coefficient of thermal expansion of the insulator and the cooperating mounting assembly.

What is claimed is:

1. Insulating structure comprising a ceramic body, provided with a plurality of oppositely disposed surfaces of frustums each of which is generated by a straight line passing through a single common point, a metallic body provided with similar surfaces of frustums each of which is generated by a straight line passing through a single common point and adapted to provide the only contact between said bodies, said metallic body having a portion providing at least one of said surfaces of split annular construction to permit assembly, and means for urging the said surfaces of said metallic body into firm engagement with the similar surfaces of said ceramic body with the said single common points of said ceramic body and said metallic body coinciding.

2. Insulating structure comprising a ceramic body, having an annular portion provided with a plurality of oppositely disposed surfaces of frustums each of which is generated by a straight line passing through a single common point, a metallic body provided with similar surfaces of frustums, each of which is generated by a straight line passing through a single common point and adapted to provide the only contact between said bodies, said metallic body having a portion providing at least one of said surfaces of split annular construction to permit assembly, and means for urging the said surfaces of said metallic body into firm engagement with the similar surfaces of said ceramic body with the said single common points of said ceramic body and said metallic body coinciding.

3. Insulating structure comprising a ceramic body, having an annular channel portion provided with a plurality of oppositely disposed surfaces of frustums each of which is generated by a straight line passing through a single common point, a metallic body provided with similar surfaces of frustums each of which is generated by a straight line passing through a single common point and adapted to provide the only contact between said bodies, said metallic body having a portion providing at least one of said surfaces of split annular construction to permit assembly, and means for urging the said surfaces of said metallic body into firm engagement with the similar surfaces of said ceramic body with the said single common points of said ceramic body and said metallic body coinciding.

4. Insulating structure comprising a ceramic body, having an annular collar portion provided with a plurality of oppositely disposed surfaces of frustums each of which is generated by a straight line passing through a single common point, a metallic body provided with similar surfaces of frustums each of which is generated by a straight line passing through a single common point and adapted to provide the only contact between said bodies, said metallic body having a portion providing at least one of said surfaces of split annular construction to permit assembly, and means for urging the said surfaces of said metallic body into firm engagement with the similar surfaces of said ceramic body with the said single common points of said ceramic body and said metallic body coinciding.

5. Insulating structure comprising a ceramic body having a peripheral groove with frusto-conical side walls, the projections of which intersect at a single common point, a metallic body comprising a split ring having frusto-conical sides adapted to fit snugly with said groove and having clearance at the bottom of said groove, said ring being split into a plurality of segments and having tapered threads on its outer surface, and a continuous clamping ring having internally tapered threads cooperating with the threads on said first mentioned ring.

6. Insulating structure comprising an elongated ceramic body having a peripheral annular groove adjacent one end thereof, the outer wall of said groove being frusto-conical, a transverse groove in the end of said body adjacent the annular groove, the side walls of said groove being inclined plane surfaces whose projections pass through the apex of the frusto-conical wall of said groove; an externally threaded, split, metallic ring in said annular groove, said ring having an end wall of frusto-conical shape, engaging the frusto-conical wall of said groove in surface-to-surface contact; an internally threaded cap positioned over the end of said ceramic body and threaded to said ring; and a wedge shaped key in said cap having inclined side walls engaging the side walls of said groove in surface-to-surface contact.

7. An insulating structure comprising a ceramic element and a metallic element, said ceramic element having an annular channel adjacent one end and surfaces thereon formed as frustrums of cones, the projected apex of each being the same identical point, said metallic element being provided with frusto-conical surfaces engaging the frusto-conical surfaces of said ceramic element and securing means urging said frusto-conical surfaces of said metallic element against said frusto-conical surfaces of said ceramic element.

8. Insulating structure comprising a ceramic element and a metallic element, said elements being provided with frusto-conical contact surfaces, said frusto-conical surfaces being radially disposed to a single common point and providing the sole contact surfaces between said metallic element and said ceramic element, said ceramic element having an annular depression formed therein thereby providing at one end of said ceramic element a portion expanded with respect to said depression, said metallic element comprising a plurality of elements engaging the expanded portion of said ceramic element and securing said metallic element to said ceramic element.

STEPHEN M. DUKE.

REFERENCES CITED

The following references are of record in the file of this patent:

UNITED STATES PATENTS

| Number | Name | Date |
| --- | --- | --- |
| 493,713 | Hathaway | Mar. 21, 1893 |
| 1,915,838 | Sprong | June 27, 1933 |
| 2,284,530 | Meyer | May 26, 1942 |

FOREIGN PATENTS

| Number | Country | Date |
| --- | --- | --- |
| 4,075 1904 | England | Apr. 28, 1904 |
| 107,528 | Austria | May 15, 1927 |